(12) United States Patent
Tang

(10) Patent No.: US 11,653,408 B2
(45) Date of Patent: *May 16, 2023

(54) DISCONTINUOUS RECEPTION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 119 days.

This patent is subject to a terminal disclaimer.

(21) Appl. No.: 17/363,756

(22) Filed: Jun. 30, 2021

(65) Prior Publication Data

US 2021/0329733 A1  Oct. 21, 2021

Related U.S. Application Data

(63) Continuation of application No. 16/621,648, filed as application No. PCT/CN2017/100954 on Sep. 7, 2017, now Pat. No. 11,076,445.

(51) Int. Cl.
*H04W 76/28* (2018.01)
*H04W 76/11* (2018.01)
(Continued)

(52) U.S. Cl.
CPC ....... *H04W 76/28* (2018.02); *H04W 52/0216* (2013.01); *H04W 52/0235* (2013.01);
(Continued)

(58) Field of Classification Search
CPC ..... H04W 76/28; H04W 76/11; H04W 76/27; H04W 52/0216; H04W 52/0235;
(Continued)

(56) References Cited

U.S. PATENT DOCUMENTS 10,645,751 B2 * 5/2020 Yi ........................ H04W 76/28
11,096,122 B2 * 8/2021 Wei ................... H04W 52/0235
(Continued)

FOREIGN PATENT DOCUMENTS

WO   2014179915   11/2014
WO   2016158394   10/2016

OTHER PUBLICATIONS

Bontu, Chandra S., and Ed Illidge. "DRX mechanism for power saving in LTE." IEEE Communications Magazine 47.6 (2009): 48-55. (Year: 2009).*
(Continued)

*Primary Examiner* — Sharad Rampuria
(74) *Attorney, Agent, or Firm* — Hodgson Russ LLP

(57) ABSTRACT

Disclosed by the present application are a discontinuous reception method, terminal device and network device, the method including: a first terminal device determining a target discontinuous reception (DRX) cycle used for the first terminal device to detect a DRX indication signal during a DRX indication cycle which is used for DRX indication signal detection, the DRX indication cycle comprising N DRX cycles, the DRX indication signal being used to indicate that the first terminal device wakes up or sleeps during an activation period of the N DRX cycles after the moment when the DRX indication signal is detected; a first terminal device detecting a DRX indication signal sent by a network device in the target DRX cycle; the first terminal device waking up or sleeping according to the DRX indication signal during the activation period of the N DRX cycles after the moment when the DRX indication signal is detected.

20 Claims, 6 Drawing Sheets

(51) Int. Cl.
*H04W 76/27* (2018.01)
*H04W 52/02* (2009.01)
*H04W 80/02* (2009.01)

(52) U.S. Cl.
CPC ............ *H04W 76/11* (2018.02); *H04W 76/27* (2018.02); *H04W 80/02* (2013.01)

(58) Field of Classification Search
CPC ..... H04W 80/02; H04W 72/04; H04W 72/12; H04W 76/00; Y02D 30/70; H04B 7/2121; H04B 7/2123; H04J 2203/0069; H04Q 2213/394
See application file for complete search history.

(56) References Cited

U.S. PATENT DOCUMENTS

| | | |
|---|---|---|
| 2012/0300685 A1 | 11/2012 | Kim et al. |
| 2014/0112221 A1* | 4/2014 | Verger .............. H04W 52/0216 370/311 |
| 2014/0348046 A1* | 11/2014 | Feng ................ H04W 76/28 370/311 |
| 2015/0131579 A1 | 5/2015 | Li et al. |
| 2016/0037513 A1 | 2/2016 | Zhang et al. |
| 2017/0339745 A1 | 11/2017 | Uchino et al. |

OTHER PUBLICATIONS

EPO, Communication for EP Application No. 17924723.4, dated Dec. 23, 2021.
IPOS, Office Action for SG Application No. 11202001948T, dated Oct. 19, 2021.
IPI, Office Action for IN Application No. 201917051913, dated Jul. 13, 2021.
JPO, Office Action for JP Application No. 2020-512801, dated Aug. 13, 2021.
IPA, Office Action for AU Application No. 2017430818, dated Nov. 3, 2022.

* cited by examiner

DISCONTINUOUS RECEPTION METHOD, TERMINAL DEVICE AND NETWORK DEVICE

CROSS-REFERENCE TO RELATED APPLICATIONS

This application is a continuation of U.S. application Ser. No. 16/621,648, filed Dec. 11, 2019, which is a U.S. National Stage Entry of International Application No. PCT/CN2017/100954, filed Sep. 7, 2017, the entire disclosures of which are incorporated herein by reference.

TECHNICAL FIELD

The present disclosure relates to the field of wireless communication, and more particularly, to a discontinuous reception method, terminal device and network device.

BACKGROUND

For the sake of power saving of terminal device, a discontinuous reception (DRX) mechanism has been introduced. Each DRX cycle includes an active period (on Duration) and a sleep period (Opportunity for DRX). A terminal device detects the control channel in the active period, and stops receiving the control channel in the sleep period during which the terminal device may stop the blind detection of the control channel, so as to reduce the power consumption, thereby improving the battery life.

SUMMARY

Embodiments of present application relates to a discontinuous reception method, terminal device and network device.

In a first aspect, there is provided a discontinuous reception method, which includes: a first terminal device determining a target DRX cycle used for the first terminal device to detect a discontinuous reception (DRX) indication signal; the first terminal device detecting a DRX indication signal sent by a network device, in or before the target DRX cycle, wherein, the DRX indication signal is used to indicate that the first terminal device wakes up or sleeps during an active period of the M DRX cycles after the moment when the DRX indication signal is detected, the M DRX cycles are the DRX indication cycle of the first terminal device, and M is a positive integer; the first terminal device wakes up or sleeps during the active period of the M DRX cycles after the moment when the DRX indication signal is detected, according to the DRX indication signal.

In a possible implementation manner, the first terminal device determining a target discontinuous reception (DRX) cycle, used for the first terminal device to detect a DRX indication signal, includes the first terminal device determining the target DRX cycle, in a DRX indication signal cycle for detecting a DRX indication signal, wherein the DRX indication signal cycle includes N DRX cycles, N is a positive integer, N=M or N≠M.

In a possible implementation manner, the first terminal device determining a target DRX cycle used for the first terminal device to detect a DRX indication signal during a DRX indication signal cycle which is used for detecting a DRX indication signal, includes: the first terminal device determining an offset value corresponding to the first terminal device, wherein, the offset value is used to indicate a position of the target DRX cycle in the DRX indication signal cycle; the first terminal device determining the target DRX cycle in the DRX indication signal cycle, according to the offset value.

In a possible implementation manner, the first terminal device determining an offset value corresponding to the first terminal device, includes: the first terminal device determining the offset value, according to User Equipment Identity UE-ID of the first terminal device.

In a possible implementation manner, the offset value is equal to mod (UE-ID, N).

In a possible implementation manner, the first terminal device determining an offset value corresponding to the first terminal device, includes: the first terminal device determining the offset value, according to the Cell Identity Cell ID of the camping cell or the servicing cell of the first terminal device.

In a possible implementation manner, the offset value is equal to mod (Cell ID, N).

In a possible implementation manner, the first terminal device determining the offset value corresponding to the first terminal device, includes: the first terminal device receiving the first configuration information sent by the network device, wherein the first configuration information is used to indicate the offset value.

In a possible implementation manner, before the first terminal device determines a target DRX cycle used for the first terminal device to detect a DRX indication signal, the method further includes: the first terminal device receiving second configuration information sent by the network device via Radio Resource Control RRC dedicated signaling, the broadcast signaling or the Media Access Control Control Element MAC CE, wherein, the second configuration information is used to indicate the number N of DRX cycles comprised in the DRX indication signal cycle.

In a possible implementation, the DRX indication signal is used to indicate that multiple terminal devices including the first terminal device, wake up or sleep during an active period of M DRX cycles after the moment when the DRX indication signal is detected.

The multiple terminal devices corresponding to N DRX cycles in the DRX indication signal cycle, and each of the N DRX cycles is used for a corresponding terminal device to detect the DRX indication signal.

In a possible implementation manner, the multiple terminal devices belong to one of the multiple device groups, and the device group to which a first terminal device belongs is determined by the UE-ID of the first terminal device, the access level of the first terminal device or the configuration parameters used to represent the device group.

In a possible implementation manner, the system frame number (SFN) of the start system frame of the DRX indication signal cycle satisfies: mod (SFN, N×T)=K, wherein, K is a pre-configured natural number, and T is the number of system frames comprised in the DRX cycle.

In a second aspect, there is provided a discontinuous reception method, which includes: a network device determining a target DRX period used for sending a discontinuous reception DRX indication signal to a first terminal device, wherein the DRX indication signal is used to indicate that the first terminal device wakes up or sleeps during an active period of the M DRX cycles after the moment when the DRX indication signal is detected, the M DRX cycles are the DRX indication cycle of the first terminal device, and M is a positive integer; the network device sends the DRX indication signal to the first terminal device in the target DRX cycle or before the target DRX cycle, so that the first terminal device wakes up or sleeps during the active period of the M DRX cycles after the moment when the DRX indication signal is detected, according to the DRX indication signal.

In a possible implementation manner, the network device determining a target DRX cycle used for sending a DRX indication signal to a first terminal device, includes the network device determining the target DRX cycle, in a DRX indication signal cycle used for terminal device to detect a DRX indication signal, wherein the DRX indication signal cycle includes N DRX cycles, N is a positive integer, N=M or N≠M.

In a possible implementation manner, the network device determining a target DRX cycle used for sending a DRX indication signal, in a DRX indication signal cycle used for sending a discontinuous reception (DRX) indication signal, includes: the network device determining an offset value corresponding to the first terminal device, wherein, the offset value is used to indicate a position of the target DRX cycle in the DRX indication signal cycle; the network device determining the target DRX cycle in the DRX indication signal cycle, according to the offset value.

In a possible implementation manner, the network device determining an offset value corresponding to the first terminal device, includes the network device determining the offset value, according to User Equipment Identity UE-ID of the first terminal device.

In a possible implementation manner, the offset value is equal to mod (UE-ID, N).

In a possible implementation manner, the network device determining an offset value corresponding to the first terminal device, includes the network device determining the offset value, according to the Cell Identity Cell ID of the camping cell or the servicing cell of the first terminal device.

In a possible implementation manner, the offset value is equal to mod (Cell ID, N).

In a possible implementation manner, the method further includes: the network device sending first configuration information to a first terminal device, wherein, the first configuration information is used to indicate the offset value.

In a possible implementation manner, before the network device sends the DRX indication signal to the first terminal device in the target DRX cycle or before the target DRX cycle, the method further includes: the network device sending second configuration information to the first terminal device via Radio Resource Control RRC dedicated signaling, the broadcast signaling or the Media Access Control Control Element MAC CE, wherein, the second configuration information is used to indicate the number N of DRX cycles comprised in the DRX indication signal cycle.

In a possible implementation, the DRX indication signal is used to indicate that multiple terminal devices including the first terminal device, wake up or sleep during an active period of M DRX cycles after the moment when the DRX indication signal is detected.

The multiple terminal devices corresponding to N DRX cycles in the DRX indication signal cycle, and each of the N DRX cycles is used for a corresponding terminal device to detect the DRX indication signal.

In a possible implementation, the multiple terminal devices belong to one of the multiple device groups, and the device group to which the first terminal device belongs is determined according to the UE-ID of the first terminal device, the access level of the first terminal device or the configuration parameter used to represent the device group.

In a possible implementation, the system frame number (SFN) of the start system frame of the DRX indication signal cycle satisfies: mod (SFN, N×T)=K, wherein, K is a pre-configured natural number, and T is the number of system frames comprised in the DRX cycle.

In a third aspect, there is provided a terminal device, which may perform the operations of a first terminal device in the foregoing first aspect or any optional implementation manner of the first aspect. In particular, the terminal device may comprise a modular unit for performing the operations of a first terminal device in the first aspect or in any possible implementation manners of the first aspect.

In a fourth aspect, there is provided a network device, which may perform the operations of a network device in the foregoing second aspect or any optional implementation manners of the second aspect. In particular, the network device may comprise a modular unit for performing the operations of a network device in the second aspect or in any possible implementation manners of the second aspect.

In a fifth aspect, there is provided a terminal device, the terminal device including: a processor, a transceiver, and a memory. The processor, the transceiver, and the memory communicate with each other through an internal connection path. The memory is configured to store instructions, and the processor is configured to execute instructions stored by the memory. When the processor executes instructions stored by the memory, the execution enables the terminal device to perform the method in the first aspect or any possible implementation manner of the first aspect, or the execution enables the terminal device to implement the terminal device provided by the third aspect.

In a sixth aspect, there is provided a network device, the network device including: a processor, a transceiver, and a memory. The processor, the transceiver, and the memory communicate with each other through an internal connection path. The memory is configured to store instructions, and the processor is configured to execute instructions stored by the memory. When the processor executes instructions stored by the memory, the execution enables the network device to perform the method in the second aspect or any possible implementation manner of the second aspect, or the execution enables the network device to implement the terminal device provided by the fourth aspect.

In a seventh aspect, there is provided a computer readable storage medium, the computer readable storage medium storing a program enabling a terminal device to perform the first aspect of the above and any of its various implementation manners of a discontinuous reception method.

In an eighth aspect, there is provided a computer readable storage medium, the computer readable storage medium storing a program enabling a network device to perform the second aspect of the above and any of its various implementation manners of a discontinuous reception method.

In a ninth aspect, there is provided a system chip, which includes an input interface, an output interface, a processor, and a memory, the processor is configured to execute instructions stored by the memory, and when the instruction is executed, the processor may implement the first aspect or any of the possible implementation manner of the first aspect.

In a tenth aspect, there is provided a system chip, which includes an input interface, an output interface, a processor, and a memory, the processor is configured to execute instructions stored by the memory, and when the instruction is executed, the processor may implement the second aspect or any of the possible implementation manner of the second aspect.

In an eleventh aspect, there is provided a computer program product including instructions, which enables the computer to perform the first aspect or any of the possible implementation manners of the first aspect, when the computer program product is running on the computer.

In a twelfth aspect, there is provided a computer program product including instructions, which enables the computer to perform the second aspect or any of the possible implementation manners of the second aspect, when the computer program product is running on the computer.

DETAILED DESCRIPTION

The technical solutions in the embodiments of the present application will be described below with reference to the accompanying drawings.

It should be understand that, the technical solutions in the embodiments of the present application may be applied to various communication systems, for example, Global System of Mobile Communication (GSM) system, Code Division Multiple Access (CDMA) system, Wideband Code Division Multiple Access (WCDMA) system, Long Term Evolution (LTE) system, LTE Frequency Division Duplex (FDD) system, LTE Time Division Duplex (TDD), Universal Mobile Telecommunication System (UMTS) or future 5G system.

The present application describes various embodiments in connection with a terminal device. The terminal device may refer to User Equipment (UE), access terminal, a subscriber unit, a subscriber station, a mobile station, a mobile platform, a remote station, a remote terminal, a mobile device, a user terminal, a terminal, a wireless communication device, a user agent or a user apparatus. The access terminal may be a cellular phone, a cordless phone, a Session Initiation Protocol (SIP) phone, a Wireless Local Loop (WLL) station, a Personal Digital Assistant (PDA), a handheld device having a wireless communication function, a computing device or other processing device connected to a wireless modem, an in-vehicle device, a wearable device, a terminal device in a future 5G network, or a terminal device in an evolved Public Land Mobile Network (PLMN) in the future.

The present application describes various embodiments in connection with a network device. The network device may be a device used to communicate with a terminal device. For example, a network device may be a Base Transceiver Station (BTS) in a GSM system or a CDMA system, or may be a NodeB (NB) in a WCDMA system, or may be an Evolutional Node B (eNB or eNodeB) in an LTE system, or the Network device may be a device used to communicate with terminal device, for example, a relay station, an access point, an in-vehicle device, a wearable device, a network side device in the future 5G network or the network device in an evolved PLMN in the future, or the like.

Figure 1:
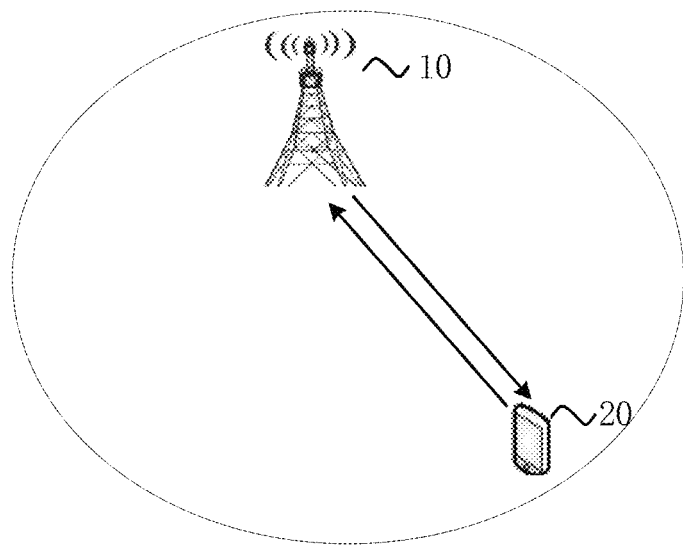
FIG. 1 is a schematic structural diagram of an application scenario of an embodiment of the present application.

FIG. 1 is a schematic diagram of an application scenario of an embodiment of the present application. The communication system in FIG. 1 may comprise a network device 10 and a terminal device 20. The network device 10 is configured to provide communication services for the terminal device 20 and access the core network. The terminal device 20 may access the network by searching for synchronization signals, broadcast signals, and the like sent by the network device 10, thereby performing communication with the network. The arrows shown in FIG. 1 may represent uplink/downlink transmissions by a cellular link between the terminal device 20 and the network device 10.

The network in the embodiment of the present application may refer to a Public Land Mobile Network (PLMN) or a Device to Device (D2D) network or a Machine to Machine/Man (M2M) network or other networks. FIG. 1 is only a simplified schematic diagram of an example, and other terminal devices may also be comprised in the network, which are not shown in FIG. 1.

Figure 2:
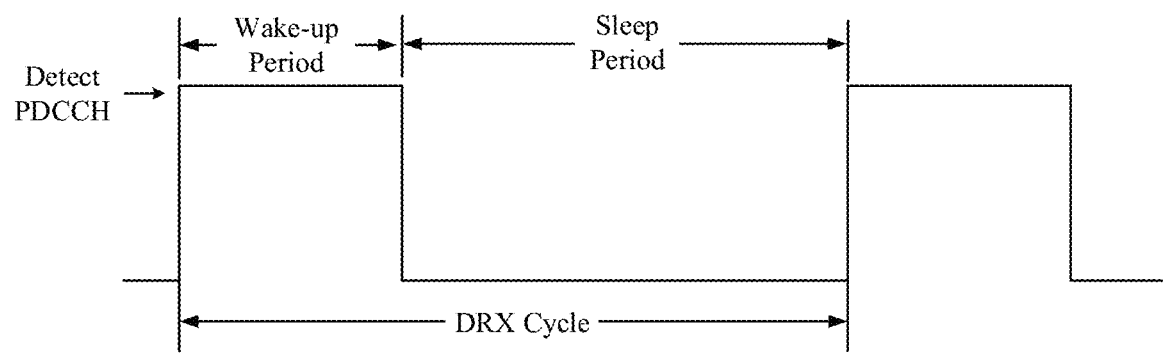
FIG. 2 is a schematic diagram of the DRX cycle.

The DRX cycle of the terminal device includes an active period (on Duration) and a sleep period (Opportunity for DRX). For example, as shown in FIG. 2, the terminal device may detect (or listening to) the Physical Downlink Control Channel (PDCCH) during the active period, that is, during the on Duration period, and the terminal device may reduce power consumption by stop receiving the PDCCH (in this case, the terminal device stops the blind detection of the PDCCH or paging message) during the sleep period, that is the Opportunity for DRX cycle, thereby increasing battery life. It can be said that during the wake-up period, the terminal device is in the wake-up state to detect the PDCCH, and during the sleep period, the terminal device enters the sleep state and does not detect the channels or signals.

Although the network configures the DRX cycle for the terminal device, the terminal device periodically detects the PDCCH during the active period. However, the terminal device is only scheduled opportunistically during the active period, and even the terminal device is scheduled only in a few DRX cycles when the service load is very low. For the paging message using DRX mechanism, the terminal receives the paging message less often. Therefore, after configuring the DRX mechanism, the terminal device may not detect the control channel during the activate period of most DRX cycles, but will still be woken up during the active period of these DRXs, thus increasing the unnecessary power consumption of the terminal device.

Therefore, in the embodiment of the present application, the terminal device detects its own DRX indication signal at a specific time, and learns whether it is actually scheduled during the active period of the subsequent multiple DRX cycles according to the DRX indication signal, and thus remaining sleep when it is not scheduled to further reduce power consumption. Moreover, since time positions for different terminal devices to detect the DRX indication signal are different when the DRX indication signal indicates wake-up and sleep of the multiple terminal devices, interference among each other may be reduced when different terminal devices detect the DRX indication signal, and the power consumption may be reduced accordingly.

The embodiments of the present application may be used not only in the detection of the PDCCH but also in the detection of the paging message. The transmission of the paging message is also a DRX mechanism in an RRC idle state. At this time, the DRX cycle is a paging cycle. A paging frame (PF) is a specific radio frame or system frame. The terminal device may try to receive paging message on a specific subframe in the PF, that is, Paging Occasion (PO). A physical downlink control channel (PDCCH) that is scrambled by the Paging Radio Network Tempory Identity (P-RNTI) and indicates the paging message may be transmitted on the PO. When DRX mechanism is applied, the terminal device only needs to detect one PO per DRX cycle. That is to say, for each terminal device, only one subframe in each DRX cycle may be used to send a paging message, PF is a system frame for sending the paging message, and PO is the subframe used to send the paging message in the PF.

Figure 3:
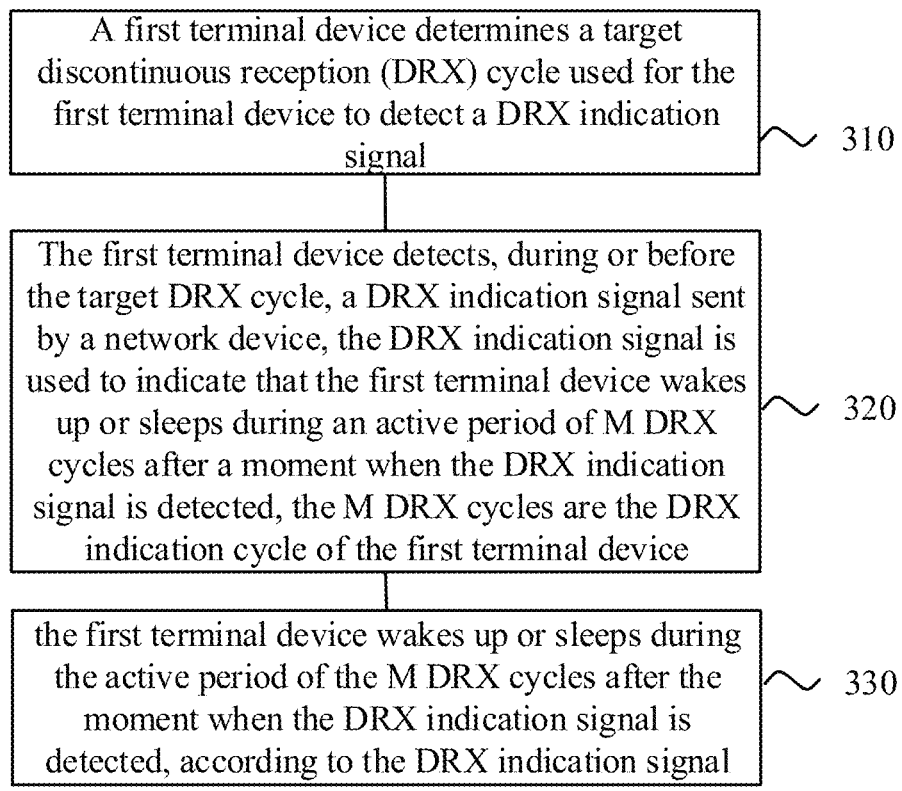
FIG. 3 is a schematic flowchart of a discontinuous reception method according to an embodiment of the present application.

FIG. 3 is a schematic flowchart of a discontinuous reception method according to an embodiment of the present application. The method shown in FIG. 3 may be performed by a first terminal device, which is terminal device 20 as shown in FIG. 1. As shown in FIG. 3, the discontinuous reception method includes the following steps.

In 310, a first terminal device determines a target discontinuous reception (DRX) cycle used for the first terminal device to detect a DRX indication signal.

In 320, a first terminal device detects, during or before the target DRX cycle, a DRX indication signal sent by a network device.

The DRX indication signal being used to indicate that the first terminal device wakes up or sleeps during an active period of M DRX cycles after the moment when the DRX indication signal is detected, the M DRX cycles being DRX indication cycle of the first terminal device, and M is a positive integer.

In 330, a first terminal device wakes up or sleeps during the active period of the M DRX cycles after the moment when the DRX indication signal is detected, according to the DRX indication signal.

Specifically, after determining a target discontinuous reception (DRX) cycle, used for the first terminal device to detect a DRX indication signal, a first terminal device may detect the DRX indication signal sent by a network device during the target DRX cycle, for example, detect the DRX indication signal in a first subframe or a first slot during the active period of the DRX cycle, or may detect the DRX indication signal before the target DRX cycle. The DRX indication signal is used to indicate that a first terminal device wakes up or sleeps during the active period in the DRX indication cycle of the first terminal device. A DRX indication cycle of a first terminal device includes M DRX cycles, and the active period in a DRX indication cycle is the active period in the M DRX cycles.

That is, a DRX indication cycle of a first terminal device is the effective duration of a DRX indication signal detected by a first terminal device in a target DRX cycle or before a target DRX cycle, and the DRX indication signal may indicate the wake-up and sleep of a terminal device in its DRX indication cycle (i.e., the following M DRX cycles). A DRX indication cycle of different terminal devices may be the same or different. The specific value of M may be configured by a network device for a terminal device, or may be the pre-existing value in a terminal device agreed by a network device and a terminal device.

Optionally, in 310, a first terminal device determining a target discontinuous reception (DRX) cycle, used for the first terminal device to detect a DRX indication signal, includes: a first terminal device determining the target DRX cycle, in a DRX indication signal cycle for performing DRX indication signal detection, wherein the DRX indication signal cycle includes N DRX cycles, N is a positive integer, N=M or N≠M.

Specifically, the DRX indication signal cycle is configured, the DRX indication signal cycle is used for a set of terminal devices to detect a DRX indication signal, wherein, a DRX indication signal cycle includes N DRX cycles, and a first terminal device of this set of terminal devices determines that in which DRX indication cycle of the DRX indication signal cycles it may detect the DRX indication signal, After determining a target DRX cycle for detecting the DRX indication signal in a DRX indication signal cycle, a first terminal device detects a DRX indication signal in the target DRX cycle or before the target DRX cycle, and wakes up or sleeps during the active period of the M DRX cycles after the moment when the DRX indication signal is detected, according to the indication of the DRX indication signal.

It should be understood that in the embodiment of the present application, the DRX cycle, the DRX indication cycle and the DRX indication signal cycle have different meanings. A DRX cycle is the time cycle shown in FIG. 2; a DRX indication cycle includes M DRX cycles, indicating that a terminal device may perform the detecting of the DRX indication signal, that is, wake-up or sleep, in the next DRX indication cycle after detecting a DRX indication signal; A DRX indication signal cycle includes N DRX cycles, and the DRX indication signal cycle is used for a set of terminal devices to detect a DRX indication signal, and different DRX cycles in the N DRX cycles may be respectively used for different terminal devices to perform DRX indication signals. M may or may not be equal to N.

Optionally, the system frame number (SFN) of the start system frame (referred to as a frame) of the DRX indication signal cycle satisfies: mod (SFN, N×T)=K, wherein, K is a pre-configured natural number (i.e., K is 0 or a positive integer), and T is the number of system frames comprised in the DRX cycle.

For example, preferably, when K=0, the DRX indication signal cycle is a time period in which the start frame satisfies mod (SFN, N×T1)=0 and the length is equal to N×T. If N=4, then SFN=0, then SFN=4×T, then SFN=8×T . . . , SFN=N×T may be used as the start frame of the DRX indication signal cycle.

For another example, when K=1, the DRX indication signal cycle is a time period in which the start frame satisfies mod (SFN, N×T1)=1 and the length is equal to N×T. If N=4, then SFN=0, then SFN=4×T, then SFN=8×T . . . , SFN=N× T+1 may be used as the start frame of the DRX indication signal cycle.

Figure 4:
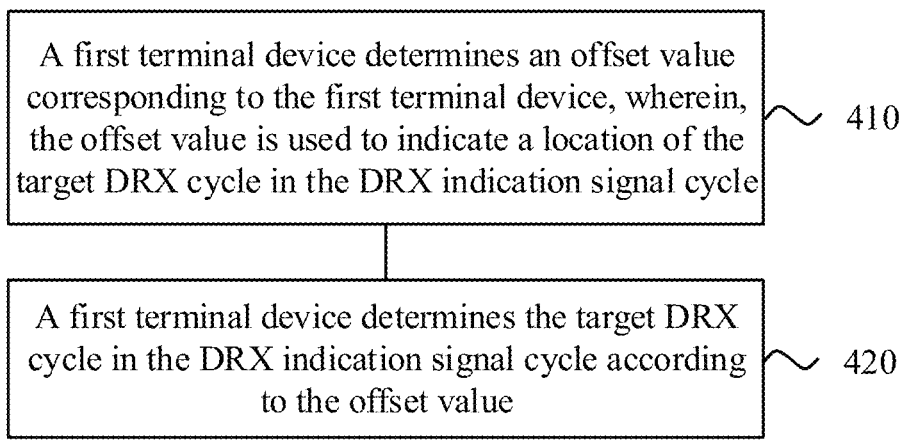
FIG. 4 is a schematic flowchart of a method for determining a target DRX cycle according to an embodiment of the present application.

Optionally, as shown in FIG. 4, 310 includes 311 and 312.

In 311, a first terminal device determines an offset value corresponding to the first terminal device, wherein, the offset value is used to indicate a location of the target DRX cycle in the DRX indication signal cycle.

In 312, a first terminal device determines the target DRX cycle in the DRX indication signal cycle according to the offset value.

For example, it is assumed that N=4, that is, the DRX indication signal cycle includes 4 DRX cycles. The offset value of 0 indicates that a target DRX cycle used for a first terminal device to detect the DRX indication signal is a first DRX cycle of the N DRX cycles; The offset value of 1 indicates that the target DRX cycle is the second DRX cycle of the N DRX cycles; The offset value of 2 indicates that the target DRX cycle is the third DRX cycle of the N DRX cycles; The offset value of 3 indicates that the target DRX cycle is the fourth DRX cycle of the N DRX cycles.

The embodiment of the present application proposes three manners for a first terminal device to determine the corresponding offset value, which is specifically described below.

Manner 1

Optionally, in 311, a first terminal device determining an offset value corresponding to the first terminal device, includes: a first terminal device determining the offset value, according to User Equipment Identity (UE-ID) of the first terminal device.

For example, the offset value corresponding to the first terminal device is mod (UE-ID, N), or writing as (UE-ID) mod N. N is the number of DRX cycles comprised in a DRX indication cycle, and mod is the remainder.

Manner 2

Optionally, in 311, a first terminal device determining an offset value corresponding to the first terminal device, includes: the first terminal device determining the offset value, according to a cell identifier (Cell ID) of the camping cell or the serving cell of a first terminal device.

For example, the offset value corresponding to the first terminal device is mod (Cell ID, N), or writing as (Cell ID) mod N. N is the number of DRX cycles comprised in a DRX indication cycle, and mod is the remainder.

Manner 3

Optionally, in 311, a first terminal device determining the offset value corresponding to the first terminal device, includes: a first terminal device receiving a first configuration information sent by the network device, wherein the first configuration information is used to indicate the offset value.

After determining the corresponding offset value based on one of the foregoing three manners, a first terminal device determines a target DRX cycle used for a first terminal device to detect the DRX indication signal in the DRX indication cycle according to the offset value.

Figure 5:
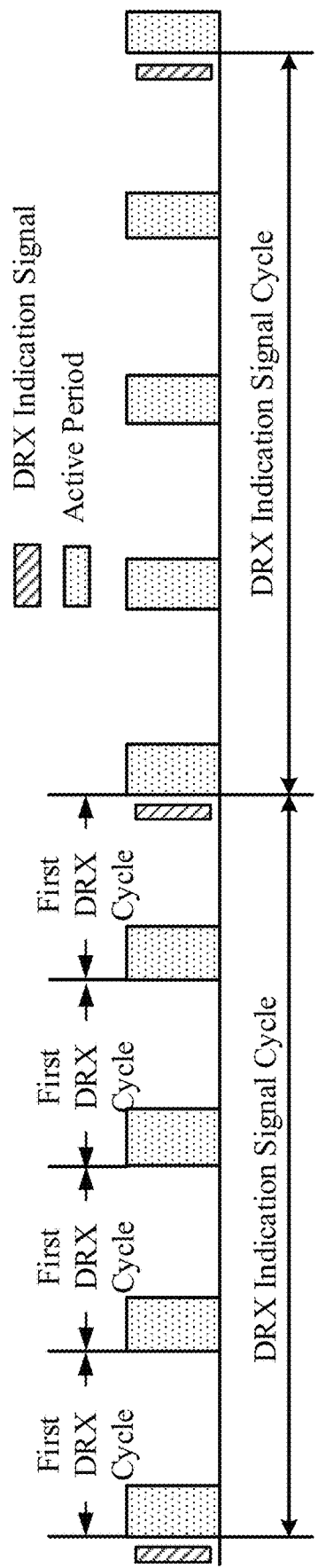
FIG. 5 is a schematic diagram of a target DRX cycle of an embodiment of the present application.

For example, as shown in FIG. 5, it is assumed that N=4, that is, one DRX indication signal cycle includes four DRX cycles, and if a first terminal device determines that the offset value corresponding to a first terminal device is 0, a first terminal device will detect the DRX indication signal before a first DRX cycle of the DRX indication signal cycle, and the first DRX cycle of the DRX indication signal cycle being a target DRX cycle of a first terminal device. If the DRX indication signal indicates that a first terminal device sleeps during the active period of the M DRX cycles in the DRX indication cycle after the moment when the DRX indication signal is detected, a terminal device may be in the sleep state during the whole active period of the M DRX cycles. When M=4, a DRX indication cycle of a first terminal device is the same as the DRX indication signal cycle.

Similarly, if a first terminal device determines that the offset value corresponding to a first terminal device is 1, a first terminal device may detect the DRX indication signal before the second DRX cycle in the DRX indication signal cycle, if the DRX indication signal indicates wake-up, then a first terminal device is in the wake-up state during the active period of the M DRX cycles in a DRX indication cycle after the moment when the DRX indication signal is detected.

It can be seen from the description of FIG. 5 that a DRX indication signal detected by a terminal device may indicate all at once the wake-up and sleep of a terminal device in the M DRX cycles, that is, the DRX indication cycle corresponding to a first terminal device. The location of the DRX indication cycle may also be different for terminal devices using different target DRX cycles.

Optionally, before 310, that is, before a first terminal device determines a target DRX cycle used for the first terminal device to detect a DRX indication signal, the method further includes: a first terminal device receiving the second configuration information sent by a network device via the Radio Resource Control (RRC) dedicated signaling, the broadcast signaling, or the Media Access Control (MAC) Control Element (CE), wherein, the second configuration information is used to indicate the length of the DRX indication signal cycle, that is, the number of DRX cycle N comprised in the DRX indication signal cycle.

For example, a DRX indication signal related to the paging message may be notified by a network device to a first terminal device related configuration information, such as the first configuration information and/or the second configuration information, by using RRC signaling during the power-on and attachment process.

For another example, for a first terminal device in the connected state, a network device may notify a first terminal device of the relevant configuration information, such as the first configuration information and/or the second configuration information, by using RRC dedicated signaling or a MAC CE.

Optionally, in 320, the DRX indication signal is used to indicate that multiple terminal devices including a first terminal device, wake up or sleep during an active period of M DRX cycles after the moment when the DRX indication signal is detected.

The plurality of terminal devices correspond to N DRX cycles in the DRX indication signal cycle, and each of the N DRX cycles is used for the corresponding terminal device to detect the DRX indication signal.

Optionally, the multiple terminal devices belong to one of the multiple device groups, and the device group to which a first terminal device belongs is determined by the UE-ID of the first terminal device, the access level of the first terminal device or the configuration parameters used to represent the device group.

Specifically, a network device may simultaneously indicate the wake-up and sleep of a plurality of terminal devices belonging to one of the multiple device groups. The plurality of terminal devices in the device group may be further divided into N subsets, the N subsets corresponding to N DRX cycles in the DRX indication signal cycle, and the terminal device in each subset detects the DRX indication signal in the corresponding DRX cycle, and determines whether to sleep or wake up according to the indication of the DRX indication signal, in the N DRX cycles after the moment when the DRX is detected.

That is, a network device sends a DRX indication signal in the N DRX cycles during the DRX indication signal cycle, but the DRX indication signals sent during each of the N DRX cycles are for terminal devices in subsets corresponding to each DRX cycle. If a DRX indication signal sent by a network device on a certain DRX cycle indicates wake-up, a terminal device that detected the DRX indication signal on the DRX cycle will wake up in the active period of the DRX indication cycle after the moment when the DRX indication signal is detected, wherein the DRX indication cycle includes M DRX cycles; if a DRX indication signal sent by a network device on a certain DRX cycle indicates sleep, a terminal device that detected the DRX indication signal on the DRX cycle will sleep in the active period of the DRX indication cycle after the moment when the DRX indication signal is detected.

The reason why the DRX indication signal cycle is set and the time at which the different terminal device detects the DRX indication signal is set to a different DRX cycle in the DRX indication signal cycle is as follows. When a network device simultaneously indicates wake-up or sleep of a group of terminal devices, if there are only a few or even just one terminal device among the multiple terminal devices in this group need to be woken up, a network device also sends the DRX indication signal to the multiple terminal devices simultaneously, so that other terminal devices without data transmission also need to be woken up, which affects the power consumption of other terminal devices.

In the embodiment of the present application, a DRX indication signal sent by a network device in the target DRX cycle may indicate wake-up or sleep of terminal devices belonging to the same device group, but different terminal devices in the device group may detect the DRX indication signal on different DRX cycles in the DRX indication signal cycle. Since the time positions of the different terminal devices in the device group detecting the DRX indication signal are different, the terminal device that does not detect the DRX indication signal avoids unnecessary wake-up, thereby reducing the power consumption.

Even if grouped into the same device group, the terminal device in the device group may detect the DRX indication signal at different times, for example, the different DRX cycles corresponding to the different offset values, so as to reduce mutual influence among the terminal devices in the same device group when detecting the DRX indication signal.

For example, the device group to which a first terminal device belongs includes 8 terminal devices, and one DRX indication signal cycle includes four DRX cycles. Then, each of the four DRX cycles may correspond to two terminal devices, that is, each DRX cycle is used only for the corresponding two terminal devices to detect the DRX indication signal. In which DRX cycle does each of the eight terminal devices detect the DRX indication signal? For example, the terminal devices may determine the corresponding offset values by the foregoing three manners, and determine in which DRX cycle it will detect the DRX indication signal according to the offset value. For example, as shown in Table 1, it is assumed that the DRX cycle corresponding to each terminal device is determined according to the UE-ID, and the terminal device 1 and the terminal device 4 detect the DRX indication signal in the first DRX cycle, and the terminal device 2 and the terminal device 5 detect the DRX indication signal in the second DRX cycle, and the terminal device 3 and the terminal device 6 detect the DRX indication signal in the third DRX cycle, and the terminal device 4 and the terminal device 8 detect the DRX indication signal in the fourth DRX cycle.

TABLE 14

| 4 DRX Cycles in DRX Indication Cycle | 8 Terminal Devices in the Device Group |
|---|---|
| First DRX cycle | Terminal Device 1 and Terminal Device 4 |
| Second DRX cycle | Terminal Device 2 and Terminal Device 5 |
| Third DRX cycle | Terminal Device 3 and Terminal Device 6 |
| Fourth DRX cycle | Terminal Device 4 and Terminal Device 8 |

Assuming that a first terminal device is the terminal device 2 here, the terminal device 2 may be in the wake-up state during the active period of its DRX indication cycle, and its DRX indication cycle may comprise, for example, M DRX cycles starting from a second DRX cycle or including the M DRX cycles starting from the next DRX cycle, that is, a third DRX cycle. At this time, since only the terminal device 5 and the terminal device 2 detect the DRX indication signal in a second DRX cycle, only the terminal device 5 and the terminal device 2 are woken up, and other terminal devices that do not need to be woken up will not be woken up. Compared with the process that 8 terminal devices simultaneously detect the DRX indication signal and are simultaneously woken up, the process that different terminal devices detect the DRX indication signal in different DRX cycles greatly reduces the power consumption of the terminal devices that do not detect the DRX indication signal in the second DRX cycle.

Therefore, in the embodiment of the present application, the terminal device detects its own DRX indication signal at a specific time, and learns whether it is scheduled during the active period of the subsequent DRX indication cycles according to the detected DRX indication signal, and thus remaining sleep when it is not scheduled to further reduce power consumption. Moreover, since time positions for different terminal devices to detect the DRX indication signal are different when the DRX indication signal indicates wake-up and sleep of the multiple terminal devices, interference among each other may be reduced when different terminal devices detect the DRX indication signal, and the power consumption may be reduced accordingly.

Figure 6:
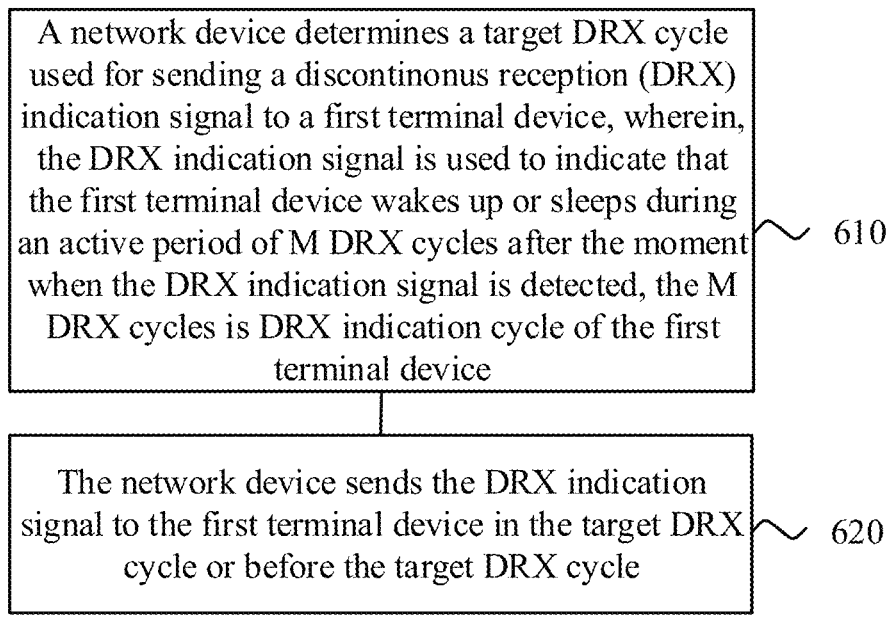
FIG. 6 is a schematic flowchart of a discontinuous reception method according to another embodiment of the present application.

FIG. 6 is a schematic flowchart of a discontinuous reception method according to an embodiment of the present application. The method shown in FIG. 6 may be performed by a network device, which may be the network device 10 shown in FIG. 1 for example. As shown in FIG. 6, the discontinuous reception method includes the following steps.

In 610, a network device determines a target DRX cycle used for sending a discontinuous reception (DRX) indication signal to a first terminal device.

The DRX indication signal is used to indicate that the first terminal device wakes up or sleeps during an active period of M DRX cycles after the moment when the DRX indication signal is detected, the M DRX cycles is DRX indication cycle of the first terminal device, and M is a positive integer.

In 620, the network device sends the DRX indication signal to the first terminal device in the target DRX cycle or before the target DRX cycle, so that the first terminal device wakes up or sleeps during the active period of the M DRX cycles after the moment when the DRX indication signal is detected, according to the DRX indication signal.

Optionally, the network device determining a target DRX cycle used for sending a DRX indication signal to a first terminal device, includes the network device determining the target DRX cycle, in a DRX indication signal cycle used for terminal device to detect a DRX indication signal, wherein the DRX indication signal cycle includes N DRX cycles, N is a positive integer, N=M or N≠M.

Specifically, the DRX indication signal cycle is configured, the DRX indication signal cycle is used for sending a DRX indication signal to a set of terminal devices, wherein, a DRX indication signal cycle includes N DRX cycles. A network device sends a corresponding DRX indication signal in the N DRX cycles, wherein the terminal device that receives the DRX indication signal may wake up or sleep during the active period of the M DRX cycles (i.e., the DRX indication cycle of a first terminal device) after the moment when the DRX indication signal is detected, according to the DRX indication signal. Different terminal devices in this set of terminal devices can detect the DRX indication signal in different DRX cycles of the DRX indication signal cycle. For example, if a network device needs to notify a first terminal device in this set of terminal devices to wake up, a network device determines a target DRX cycle used for a first terminal device to detect a DRX indication signal in the DRX indication signal cycle, and sends a DRX indication signal used for indicating wake-up in the target DRX cycle. Then a first terminal device detects the DRX indication signal in the target DRX cycle, and wakes up during the active period of the M DRX cycles (i.e., the DRX indication cycle of a first terminal device) after the moment when the DRX indication signal is detected, according to the DRX indication signal.

Therefore, in the embodiment of the present application, a network device notifies a terminal device that needs to be woken up or sleep by sending the DRX indication signal at a specific time, so that the terminal device may detect the DRX indication signal at the specific time position, and learn whether it is scheduled during the active period of the subsequent DRX indication cycles according to the detected DRX indication signal, and thus remaining sleep when it is not scheduled to further reduce power consumption. Moreover, since time positions for different terminal devices to detect the DRX indication signal are different when the DRX indication signal indicates wake-up and sleep of the multiple terminal devices, interference among each other may be reduced when different terminal devices detect the DRX indication signal, and the power consumption may be reduced accordingly.

Optionally, the network device determining a target DRX cycle used for sending a DRX indication signal, in a DRX indication signal cycle used for sending a discontinuous reception (DRX) indication signal, includes: the network device determining an offset value corresponding to the first terminal device, wherein, the offset value is used to indicate a position of the target DRX cycle in the DRX indication signal cycle; the network device determining the target DRX cycle in the DRX indication signal cycle, according to the offset value.

Optionally, the network device determining an offset value corresponding to the first terminal device, includes the network device determining the offset value, according to User Equipment Identity UE-ID of the first terminal device.

Optionally, the offset value is equal to mod (UE-ID, N).

Optionally, the network device determining an offset value corresponding to the first terminal device, includes the network device determining the offset value, according to the Cell Identity Cell ID of the camping cell or the servicing cell of the first terminal device.

Optionally, the offset value is equal to mod (Cell ID, N).

Optionally, the method further includes: the network device sending first configuration information to a first terminal device, wherein, the first configuration information is used to indicate the offset value.

Optionally, before the network device sending the DRX indication signal to the first terminal device in the target DRX cycle, the method further includes: the network device sending second configuration information to the first terminal device via Radio Resource Control RRC dedicated signaling, the broadcast signaling or the Media Access Control Control Element MAC CE, wherein, the second configuration information is used to indicate the number N of DRX cycles comprised in the DRX indication signal cycle.

Optionally, the DRX indication signal is used to indicate that multiple terminal devices including the first terminal device, wake up or sleep during an active period of M DRX cycles after the moment when the DRX indication signal is detected.

The multiple terminal devices corresponding to N DRX cycles in the DRX indication signal cycle, and each of the N DRX cycles is used for a corresponding terminal device to detect the DRX indication signal.

Optionally, the multiple terminal devices belong to one of the multiple device groups, and the device group to which the first terminal device belongs is determined according to the UE-ID of the first terminal device, the access level of the first terminal device or the configuration parameter used to represent the device grouping.

Optionally, the DRX indication signal cycle satisfies T2=mod(SFN, M×T1), wherein, SFN is a system frame number of a system frame in which the DRX indication signal cycle is located, and T2 is the length of the DRX indication signal cycle, T1 is the length of the DRX cycle.

It should be understood that the specific details of a network device in determining a target DRX cycle and the process of sending a DRX indication signal may be referred to the related description of the terminal device in FIG. 3 to FIG. 5, and details are not described herein again for brevity.

It should also be understood that in the various embodiments of this application, the sequence number of the above mentioned processes does not mean the sequence of implementation, and the sequence of implementation of each process shall be determined by its function and internal logic, and shall not constitute any limitation on the implementation process of this application embodiment.

Figure 7:
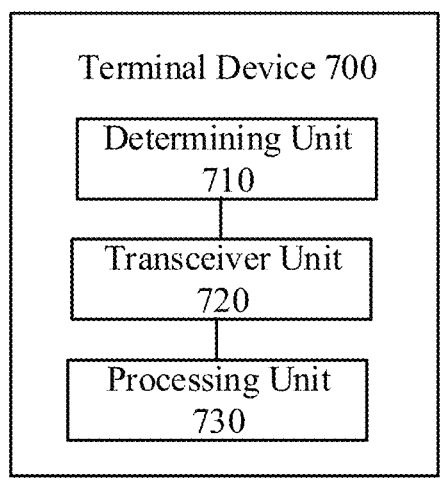
FIG. 7 is a schematic block diagram of a terminal device according to an embodiment of the present application.

FIG. 7 is a schematic block diagram of terminal device 700 according to an embodiment of the present application. The terminal device is a first terminal device. As shown in FIG. 7, the first terminal device 700 includes a determining unit 710, a transceiver unit 720, and a processing unit 730.

The determining unit 710 is configured to determine a target DRX cycle used for the first terminal device to detect a discontinuous reception (DRX) indication signal.

The transceiver unit 720 is configured to detect a DRX indication signal sent by a network device, in or before the target DRX cycle determined by the determining unit 710, wherein, the DRX indication signal is used to indicate that the first terminal device wakes up or sleeps during an active period of the M DRX cycles after the moment when the DRX indication signal is detected, the M DRX cycles are the DRX indication cycle of the first terminal device, and M is a positive integer.

The processing unit 730 is configured to wake up or sleep during the active period of the M DRX cycles after the moment when the DRX indication signal is detected, according to the DRX indication signal detected by the transceiver unit 720.

Therefore, the terminal device detects its own DRX indication signal at a specific time, and learns whether it is scheduled during the active period of the subsequent DRX indication cycles according to the detected DRX indication signal, and thus remaining sleep when it is not scheduled to further reduce power consumption. Moreover, since time positions for different terminal devices to detect the DRX indication signal are different when the DRX indication signal indicates wake-up and sleep of the multiple terminal devices, interference among each other may be reduced when different terminal devices detect the DRX indication signal, and the power consumption may be reduced accordingly.

Optionally, the determining unit 710 is specifically configured to determine the target DRX cycle, in a DRX indication signal cycle used for detecting a DRX indication signal, wherein the DRX indication signal cycle includes N DRX cycles, N is a positive integer, N=M or N≠M.

Optionally, the determining unit 710 is specifically configured to determine an offset value corresponding to the first terminal device, wherein, the offset value is used to indicate a position of the target DRX cycle in the DRX indication signal cycle; determine the target DRX cycle in the DRX indication signal cycle, according to the offset value.

Optionally, the determining unit 710 is specifically configured to determine the offset value, according to User Equipment Identity UE-ID of the first terminal device.

Optionally, the offset value is equal to mod (UE-ID, N).

Optionally, the determining unit 710 is specifically configured to determine the offset value, according to the Cell Identity Cell ID of the camping cell or the servicing cell of the first terminal device.

Optionally, the offset value is equal to mod (Cell ID, N).

Optionally, the determining unit 710 is specifically configured to receive first configuration information sent by the network device via the transceiver unit 720, wherein, the first configuration information is used to indicate the offset value.

Optionally, the transceiver unit 720 is further configured to receive second configuration information sent by the network device via Radio Resource Control RRC dedicated signaling, the broadcast signaling or the Media Access Control Control Element MAC CE, wherein, the second configuration information is used to indicate the number N of DRX cycles comprised in the DRX indication signal cycle.

Optionally, the DRX indication signal is used to indicate that multiple terminal devices including the first terminal device, wake up or sleep during an active period of M DRX cycles after the moment when the DRX indication signal is detected.

The multiple terminal devices corresponding to N DRX cycles in the DRX indication signal cycle, and each of the N DRX cycles is used for a corresponding terminal device to detect the DRX indication signal.

Optionally, the multiple terminal devices belong to one of the multiple device groups, and the device group to which the first terminal device belongs is determined according to the UE-ID of the first terminal device, the access level of the first terminal device or the configuration parameter used to represent the device grouping.

Optionally, the DRX indication signal cycle satisfies T2=mod(SFN, M×T1), wherein, SFN is a system frame number of a system frame in which the DRX indication signal cycle is located, and T2 is the length of the DRX indication signal cycle, T1 is the length of the DRX cycle.

Figure 8:
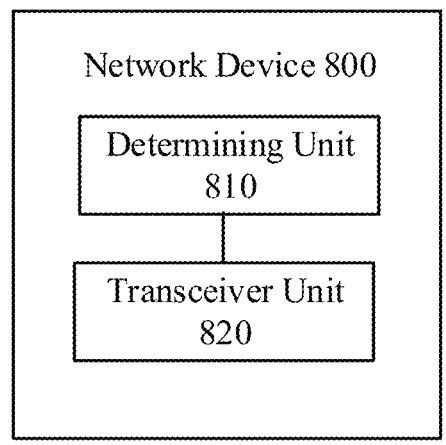
FIG. 8 is a schematic block diagram of a network device according to an embodiment of the present application.

FIG. 8 is a schematic block diagram of network device 800 according to an embodiment of the present application. As shown in FIG. 8, the network device 800 includes a determining unit 810 and a transceiver unit 820.

The determining unit 810 is configured to determine a target DRX cycle used for a first terminal device to detect a discontinuous reception (DRX) indication signal, the DRX indication signal being used to indicate that the first terminal device wakes up or sleeps during an active period of M DRX cycles after the moment when the DRX indication signal is detected, the M DRX cycles being DRX indication cycle of the first terminal device, and M is a positive integer.

The transceiver unit 820 is configured to send the DRX indication signal to the first terminal device in or before the target DRX cycle determined by the determining unit 810, so that the first terminal device wakes up or sleeps during the active period of the M DRX cycles after the moment when the DRX indication signal is detected, according to the DRX indication signal.

Therefore, a network device notifies a terminal device that needs to be woken up or sleep by sending the DRX indication signal at a specific time, so that the terminal device may detect the DRX indication signal at the specific time position, and learn whether it is scheduled during the active period of the subsequent DRX indication cycles according to the detected DRX indication signal, and thus remaining sleep when it is not scheduled to further reduce power consumption. Moreover, since time positions for different terminal devices to detect the DRX indication signal are different when the DRX indication signal indicates wake-up and sleep of the multiple terminal devices, interference among each other may be reduced when different terminal devices detect the DRX indication signal, and the power consumption may be reduced accordingly.

Optionally, the determining unit 810 is specifically configured to determine the target DRX cycle, in a DRX indication signal cycle used for a terminal device to detect a DRX indication signal, wherein the DRX indication signal cycle includes N DRX cycles, N is a positive integer, N=M or N≠M.

Optionally, the determining unit 810 is specifically configured to determine an offset value corresponding to the first terminal device, wherein, the offset value is used to indicate a position of the target DRX cycle in the DRX indication signal cycle; determine the target DRX cycle in the DRX indication signal cycle, according to the offset value.

Optionally, the determining unit 810 is specifically configured to determine the offset value, according to User Equipment Identity UE-ID of the first terminal device.

Optionally, the offset value is equal to mod (UE-ID, N).

Optionally, the determining unit 810 is specifically configured to determine the offset value, according to the Cell Identity Cell ID of the camping cell or the servicing cell of the first terminal device.

Optionally, the offset value is equal to mod (Cell ID, N).

Optionally, the transceiver unit 820 is further configured to send first configuration information to a first terminal device, wherein, the first configuration information is used to indicate the offset value.

Optionally, the transceiver unit 820 is further configured to send second configuration information to the first terminal device via Radio Resource Control RRC dedicated signaling, the broadcast signaling or the Media Access Control Control Element MAC CE, wherein, the second configuration information is used to indicate the number N of DRX cycles comprised in the DRX indication signal cycle.

Optionally, the DRX indication signal is used to indicate that multiple terminal devices including the first terminal device, wake up or sleep during an active period of M DRX cycles after the moment when the DRX indication signal is detected.

The multiple terminal devices corresponding to N DRX cycles in the DRX indication signal cycle, and each of the N DRX cycles is used for a corresponding terminal device to detect the DRX indication signal.

Optionally, the multiple terminal devices belong to one of the multiple device groups, and the device group to which the first terminal device belongs is determined according to the UE-ID of the first terminal device, the access level of the first terminal device or the configuration parameter used to represent the device grouping.

Optionally, the DRX indication signal cycle satisfies T2=mod(SFN, M×T1), wherein, SFN is a system frame number of a system frame in which the DRX indication signal cycle is located, and T2 is the length of the DRX indication signal cycle, T1 is the length of the DRX cycle.

Figure 9:
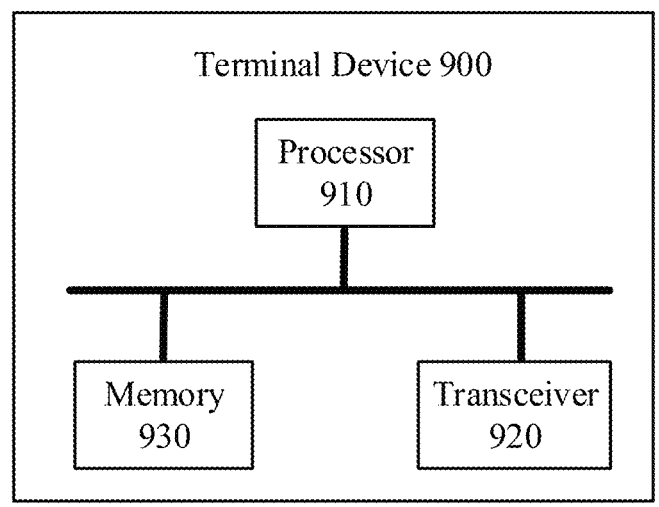
FIG. 9 is a schematic structural diagram of a terminal device according to an embodiment of the present application.

FIG. 9 is a schematic structural diagram of terminal device 900 according to an embodiment of the present application. The terminal device is a first terminal device. As shown in FIG. 9, the first terminal device includes a processor 910, a transceiver 920, and a memory 930, wherein the processor 910, the transceiver 920, and the memory 930 communicate with each other through an internal connection path. The memory 930 is configured to store instructions, and the processor 910 is configured to execute instructions stored by the memory 930 to control the transceiver 920 to receive signals or transmit signals.

The processor 910 is configured to determine a target DRX cycle used for the first terminal device to detect a discontinuous reception (DRX) indication signal.

The transceiver unit 920 is configured to detect a DRX indication signal sent by a network device, in or before the target DRX cycle determined by the processor 910, wherein, the DRX indication signal is used to indicate that the first terminal device wakes up or sleeps during an active period of the M DRX cycles after the moment when the DRX indication signal is detected, the M DRX cycles are the DRX indication cycle of the first terminal device, and M is a positive integer.

The processor 910 is further configured to wake up or sleep during the active period of the M DRX cycles after the moment when the DRX indication signal is detected, according to the DRX indication signal detected by the transceiver 920.

Therefore, the terminal device detects its own DRX indication signal at a specific time, and learns whether it is scheduled during the active period of the subsequent DRX indication cycles according to the detected DRX indication signal, and thus remaining sleep when it is not scheduled to further reduce power consumption. Moreover, since time positions for different terminal devices to detect the DRX indication signal are different when the DRX indication signal indicates wake-up and sleep of the multiple terminal devices, interference among each other may be reduced when different terminal devices detect the DRX indication signal, and the power consumption may be reduced accordingly.

Optionally, the processor 910 is specifically configured to determine the target DRX cycle, in a DRX indication signal cycle used for detecting a DRX indication signal, wherein the DRX indication signal cycle includes N DRX cycles, N is a positive integer, N=M or N≠M.

Optionally, the processor 910 is specifically configured to determine an offset value corresponding to the first terminal device, wherein, the offset value is used to indicate a position of the target DRX cycle in the DRX indication signal cycle; determine the target DRX cycle in the DRX indication signal cycle, according to the offset value.

Optionally, the processor 910 is specifically configured to determine the offset value, according to User Equipment Identity UE-ID of the first terminal device.

Optionally, the offset value is equal to mod (UE-ID, N).

Optionally, the processor 910 is specifically configured to determine the offset value, according to the Cell Identity Cell ID of the camping cell or the servicing cell of the first terminal device.

Optionally, the offset value is equal to mod (Cell ID, N).

Optionally, the processor 910 is specifically configured to receive first configuration information sent by the network device via the transceiver 920, wherein, the first configuration information is used to indicate the offset value.

Optionally, the transceiver 920 is further configured to receive second configuration information sent by the network device via Radio Resource Control RRC dedicated signaling, the broadcast signaling or the Media Access Control Control Element MAC CE, wherein, the second configuration information is used to indicate the number N of DRX cycles comprised in the DRX indication signal cycle.

Optionally, the DRX indication signal is used to indicate that multiple terminal devices including the first terminal device, wake up or sleep during an active period of M DRX cycles after the moment when the DRX indication signal is detected.

The multiple terminal devices corresponding to N DRX cycles in the DRX indication signal cycle, and each of the N DRX cycles is used for a corresponding terminal device to detect the DRX indication signal.

Optionally, the multiple terminal devices belong to one of the multiple device groups, and the device group to which the first terminal device belongs is determined according to the UE-ID of the first terminal device, the access level of the first terminal device or the configuration parameter used to represent the device grouping.

Optionally, the DRX indication signal cycle satisfies T2=mod(SFN, M×T1), wherein, SFN is a system frame number of a system frame in which the DRX indication signal cycle is located, and T2 is the length of the DRX indication signal cycle, T1 is the length of the DRX cycle.

It should be understood that, in the embodiment of the present application, the processor 910 may be a central processing unit (CPU), and the processor 910 may also be a general-purpose processor, a digital signal processor (DSP), an application specific integrated circuit (ASIC), a field programmable gate array (FPGA) or other programmable logic device, discrete gate or transistor logic device, discrete hardware component, etc. The general-purpose processor may be a microprocessor or any regular processor, etc.

The memory 930 may comprise read only memory and random access memory and provide instructions and data to the processor 910. A portion of the memory 930 may also include a non-volatile random access memory.

In the implementation process, each step of the foregoing method may be completed by an integrated logic circuit of hardware or an instruction in a form of software in the processor 910. The steps of the positioning method disclosed in the embodiment of the present application may be directly implemented by the hardware processor, or may be performed by a combination of hardware and software modules in the processor 910. The software module may be located in a conventional storage medium such as random access memory, flash memory, read only memory, programmable read only memory or electrically erasable programmable memory, registers, and the like. The storage medium is located in the memory 930, and the processor 910 reads the information in the memory 930 and completes the steps of the above method in combination with its hardware. To avoid repetition, it will not be described in detail here.

The terminal device 900 according to the embodiment of the present application may correspond to the terminal device for performing the method 300 in the foregoing method 300, and the terminal device 700 according to the embodiment of the present application, and each unit or module in the terminal device 900 is used to perform each action or processing performed by the terminal device in method 300 respectively. Here, in order to avoid redundancy, detailed description thereof will be omitted.

Figure 10:
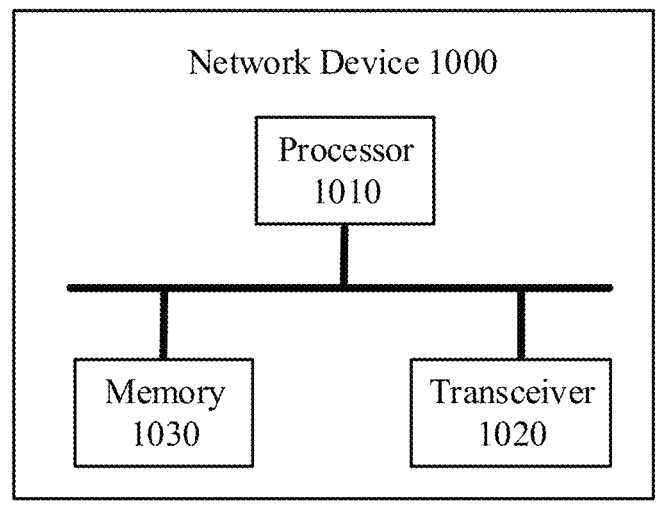
FIG. 10 is a schematic structural diagram of a network device according to an embodiment of the present application.

FIG. 10 is a schematic structural diagram of network device 1000 according to an embodiment of the present application. As shown in FIG. 10, the network device includes a processor 1010, a transceiver 1020, and a memory 1030, wherein the processor 1010, the transceiver 1020, and the memory 1030 communicate with each other through an internal connection path. The memory 1030 is configured to store instructions, and the processor 1010 is configured to execute instructions stored by the memory 1030 to control the transceiver 1020 to receive signals or transmit signals.

The processor 1010 is configured to determine a target DRX cycle used for sending a discontinuous reception (DRX) indication signal to a first terminal device in the discontinuous reception DRX indication cycle, wherein, the DRX indication cycle is used for the first terminal device to detect DRX indication signal, the DRX indication cycle includes N DRX cycles, the DRX indication signal is used to indicate that the first terminal device wakes up or sleeps during an active period of M DRX cycles after the moment when the DRX indication signal is detected, N is a positive integer.

The transceiver 1020 is configured to send the DRX indication signal to the first terminal device in or before the target DRX cycle determined by the processor 1010, so that the first terminal device wakes up or sleeps during the active period of N DRX cycles after the moment when the DRX indication signal is detected, according to the DRX indication signal.

Therefore, a network device notifies a terminal device that needs to be woken up or sleep by sending the DRX indication signal at a specific time, so that the terminal device may detect the DRX indication signal at the specific time position, and learn whether it is scheduled during the active period of the subsequent DRX indication cycles according to the detected DRX indication signal, and thus remaining sleep when it is not scheduled to further reduce power consumption. Moreover, since time positions for different terminal devices to detect the DRX indication signal are different when the DRX indication signal indicates wake-up and sleep of the multiple terminal devices, interference among each other may be reduced when different terminal devices detect the DRX indication signal, and the power consumption may be reduced accordingly.

Optionally, the processor 1010 is specifically configured to determine the target DRX cycle, in a DRX indication signal cycle used for a terminal device to detect a DRX indication signal, wherein the DRX indication signal cycle includes N DRX cycles, N is a positive integer, N=M or N≠M.

Optionally, the processor 1010 is specifically configured to determine an offset value corresponding to the first terminal device, wherein, the offset value is used to indicate a position of the target DRX cycle in the DRX indication signal cycle; determine the target DRX cycle in the DRX indication signal cycle, according to the offset value.

Optionally, the processor 1010 is specifically configured to determine the offset value, according to User Equipment Identity UE-ID of the first terminal device.

Optionally, the offset value is equal to mod (UE-ID, N).

Optionally, the processor 1010 is specifically configured to determine the offset value, according to the Cell Identity Cell ID of the camping cell or the servicing cell of the first terminal device.

Optionally, the offset value is equal to mod (Cell ID, N).

Optionally, the transceiver 1020 is further configured to send first configuration information to a first terminal device, wherein, the first configuration information is used to indicate the offset value.

Optionally, the transceiver 1020 is further configured to send second configuration information to the first terminal device via Radio Resource Control RRC dedicated signaling, the broadcast signaling or the Media Access Control Control Element MAC CE, wherein, the second configuration information is used to indicate the number N of DRX cycles comprised in the DRX indication signal cycle.

Optionally, the DRX indication signal is used to indicate that multiple terminal devices including the first terminal device, wake up or sleep during an active period of M DRX cycles after the moment when the DRX indication signal is detected.

The multiple terminal devices corresponding to N DRX cycles in the DRX indication signal cycle, and each of the N DRX cycles is used for a corresponding terminal device to detect the DRX indication signal.

Optionally, the multiple terminal devices belong to one of the multiple device groups, and the device group to which the first terminal device belongs is determined according to the UE-ID of the first terminal device, the access level of the first terminal device or the configuration parameter used to represent the device grouping.

Optionally, the DRX indication signal cycle satisfies T2=mod(SFN, M×T1), wherein, SFN is a system frame number of a system frame in which the DRX indication signal cycle is located, and T2 is the length of the DRX indication signal cycle, T1 is the length of the DRX cycle.

It should be understood that, in the embodiment of the present application, the processor 1010 may be a central processing unit (CPU), and the processor 1010 may also be a general-purpose processor, a digital signal processor (DSP), an application specific integrated circuit (ASIC), a field programmable gate array (FPGA) or other programmable logic device, discrete gate or transistor logic device, discrete hardware component, etc. The general-purpose processor may be a microprocessor or any regular processor, etc.

The memory 1030 may comprise read only memory and random access memory and provide instructions and data to the processor 1010. A portion of the memory 1030 may also include a non-volatile random access memory. In the implementation process, each step of the foregoing method may be completed by an integrated logic circuit of hardware or an instruction in a form of software in the processor 1010. The steps of the positioning method disclosed in the embodiment of the present application may be directly implemented by the hardware processor, or may be performed by a combination of hardware and software modules in the processor 1010. The software module may be located in a conventional storage medium such as random access memory, flash memory, read only memory, programmable read only memory or electrically erasable programmable memory, registers, and the like. The storage medium is located in the memory 1030, and the processor 1010 reads the information in the memory 1030 and completes the steps of the above method in combination with its hardware. To avoid repetition, it will not be described in detail here.

The network device 1000 according to the embodiment of the present application may correspond to the network device for performing the method 600 in the foregoing method 600, and the network device 800 according to the embodiment of the present application, and each unit or module in the network device 1000 is used to perform each action or processing performed by the network device in method 600 respectively. Here, in order to avoid redundancy, detailed description thereof will be omitted.

Figure 11:
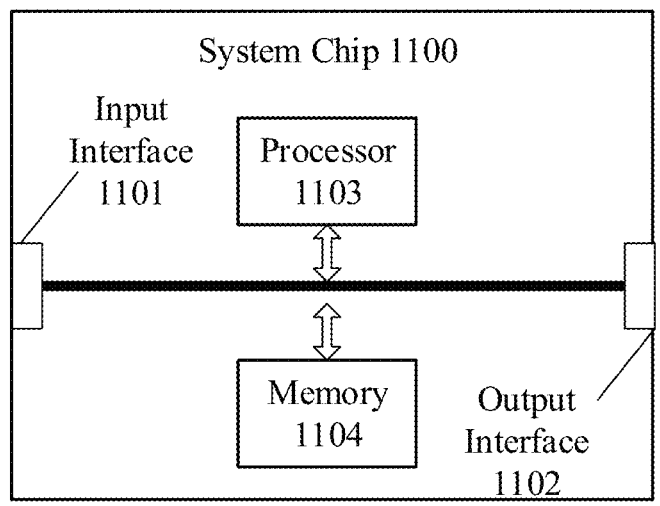
FIG. 11 is a schematic structural diagram of a system chip according to an embodiment of the present application.

FIG. 11 is a schematic structural diagram of a system chip according to an embodiment of the present application. The system chip 1100 of FIG. 11 includes an input interface 1101, an output interface 1102, at least one processor 1103 and a memory 1104. The input interface 1101, the output interface 1102, the processor 1103, and the memory 1104 are interconnected by an internal connection path. The processor 1103 is configured to execute code in the memory 1104.

Optionally, when the code is executed, the processor 1103 may implement the method 300 performed by a first terminal device in the method embodiment. To avoid repetition, it will not be described in detail here.

Optionally, when the code is executed, the processor 1103 may implement the method 600 performed by a network device in the method embodiment. To avoid repetition, it will not be described in detail here.

Those of ordinary skill in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the solution. A person skilled in the art may use different methods to implement the described functions for each particular application, but such implementation should not be considered to be beyond the scope of the present application.

A person skilled in the art can clearly understand that for the convenience and brevity of the description, the specific working process of the system, the device and the unit described above may refer to the corresponding process in the foregoing method embodiment, and details are not described herein again.

In the several embodiments provided by the present application, it should be understood that the disclosed systems, devices, and methods may be implemented in other manners. For example, the device embodiments described above are merely illustrative. For example, the division of the unit is only a logical function division. In actual implementation, there may be another division manner, for example, multiple units or components may be combined or may be integrate into another system, or some features may be ignored or not executed. In addition, the mutual coupling or direct coupling or communication connection shown or discussed may be an indirect coupling or communication connection through some interface, device or unit, which may be in an electrical, mechanical or other form.

The units described as separate components may or may not be physically separate, and the components displayed as units may or may not be physical units, i.e., may be located a place, or it can be distributed to multiple network units. Some or all of the units may be selected according to actual needs to achieve the purpose of the solution of the embodiment.

In addition, each functional unit in each embodiment of the present application may be integrated into one monitoring unit, or each unit may exist physically separately, or two or more units may be integrated into one unit.

This functionality, if implemented as a software functional unit and sold or used as a standalone product, may be stored on a computer readable storage medium. Based on such understanding, the technical solution of the present application, which is essential or contributes to the prior art, or a part of the technical solution, may be embodied in the form of a software product, which is stored in a storage medium, including instructions used to enable a computer device (which may be a personal computer, server, or network device, etc.) to perform all or part of the steps of the methods described in various embodiments of the present application. The foregoing storage medium includes: a U disk, a mobile hard disk, a read-only memory (ROM), a random access memory (RAM), a magnetic disk, or an optical disk, and the like, which may store program codes.

The above descriptions are only for illustrating the embodiments of the present application, and in no way limit the scope of the embodiments of the present application. The variations or alternations that may be easily thought of by those skilled in the art within the technical scope disclosed by the embodiments of the present application shall be covered within the scope of self-serving protection of this application. Therefore, the protection scope of this application shall be subject to the protection scope of the claims.

What is claimed is:

1. A discontinuous reception method, wherein the method comprises:
    a first terminal device determining a target DRX cycle used for the first terminal device to detect a discontinuous reception (DRX) indication signal;
    the first terminal device detecting the DRX indication signal sent by a network device, in or before the target DRX cycle, wherein, the DRX indication signal is used to indicate that the first terminal device wakes up or sleeps during an active period of M DRX cycles after a moment when the DRX indication signal is detected, the M DRX cycles are the DRX indication cycle of the first terminal device, and M is a positive integer;
    the first terminal device wakes up or sleeps during the active period of the M DRX cycles after the moment when the DRX indication signal is detected, according to the DRX indication signal.

2. The method according to claim 1, wherein, the first terminal device determining the target discontinuous reception (DRX) cycle used for the first terminal device to detect the DRX indication signal, comprises:
    the first terminal device determining the target DRX cycle, in a DRX indication signal cycle used for detecting the DRX indication signal, wherein the DRX indication signal cycle comprises N DRX cycles, N is a positive integer, N=M or N≠M.

3. The method according to claim 2, wherein, the first terminal device determining the target DRX cycle used for the first terminal device to detect the DRX indication signal during the DRX indication signal cycle which is used for detecting the DRX indication signal, comprises:
the first terminal device determining an offset value corresponding to the first terminal device, wherein, the offset value is used to indicate a location of the target DRX cycle in the DRX indication signal cycle;
the first terminal device determining the target DRX cycle in the DRX indication signal cycle according to the offset value.

4. The method according to claim 3, wherein, the first terminal device determining the offset value corresponding to the first terminal device, comprises:
the first terminal device determining the offset value, according to User Equipment Identity (UE-ID) of the first terminal device,
wherein, the offset value is equal to mod (UE-ID, N).

5. The method according to claim 3, wherein, the first terminal device determining the offset value corresponding to the first terminal device, comprises:
the first terminal device determining the offset value, according to a Cell Identity (Cell ID) of a camping cell or a servicing cell of the first terminal device,
wherein, the offset value is equal to mod (Cell ID, N).

6. The method according to claim 3, wherein, the first terminal device determining the offset value corresponding to the first terminal device, comprises:
the first terminal device receiving first configuration information sent by the network device, wherein, the first configuration information is used to indicate the offset value.

7. The method according to claim 1, wherein, before the first terminal device determines the target DRX cycle used for the first terminal device to detect the DRX indication signal during the DRX indication signal cycle, the method further comprises:
the first terminal device receiving second configuration information sent by the network device via Radio Resource Control (RRC) dedicated signaling, broadcast signaling or Media Access Control Control Element (MAC CE), wherein, the second configuration information is used to indicate number N of DRX cycles comprised in the DRX indication signal cycle.

8. The method according to claim 1, wherein the DRX indication signal is used to indicate that multiple terminal devices comprising the first terminal device, wake up or sleep during the active period of M DRX cycles after the moment when the DRX indication signal is detected,
wherein, the multiple terminal devices corresponding to N DRX cycles in the DRX indication signal cycle, and each of the N DRX cycles is used for a corresponding terminal device to detect the DRX indication signal.

9. The method according to claim 8, wherein, the multiple terminal devices belong to one of multiple device groups, and the device group to which the first terminal device belongs is determined according to a UE-ID of the first terminal device, an access level of the first terminal device or a configuration parameter used to represent the device group.

10. The method according to claim 1, wherein, a system frame number (SFN) of a start system frame of the DRX indication signal cycle satisfies: mod (SFN, N×T)=K, wherein, K is a pre-configured natural number, and T is a number of system frames comprised in the DRX cycle.

11. A terminal device, wherein, the terminal device is a first terminal device, the first terminal device comprises a processor, a transceiver, and a memory, wherein when the processor executes instructions stored by the memory, the execution enables the terminal device to:
determine, by the processor, a target DRX cycle used for the first terminal device to detect a discontinuous reception (DRX) indication signal;
detect, by the transceiver, the DRX indication signal sent by a network device in the target DRX cycle, wherein, the DRX indication signal is used to indicate that the first terminal device wakes up or sleeps during an active period of M DRX cycles after a moment when the DRX indication signal is detected, the M DRX cycles are the DRX indication cycle of the first terminal device, and M is a positive integer;
wherein the processor wakes up or sleeps during the active period of the M DRX cycles after the moment when the DRX indication signal is detected, according to the DRX indication signal detected by the transceiver.

12. The terminal device according to claim 11, wherein, the processor is specifically configured to:
determine the target DRX cycle, in a DRX indication signal cycle used for detecting the DRX indication signal, wherein the DRX indication signal cycle comprises N DRX cycles, N is a positive integer, N=M or N≠M.

13. The terminal device according to claim 12, wherein, the processor is specifically configured to:
determine an offset value corresponding to the first terminal device, wherein, the offset value is used to indicate a location of the target DRX cycle in the DRX indication signal cycle;
determine the target DRX cycle in the DRX indication signal cycle according to the offset value.

14. The terminal device according to claim 13, wherein, the processor is specifically configured to:
determine the offset value, according to User Equipment Identity (UE-ID) of the first terminal device,
wherein, the offset value is equal to mod (UE-ID, N).

15. The terminal device according to claim 13, wherein, the processor is specifically configured to:
determine the offset value, according to a Cell Identity (Cell ID) of a camping cell or a servicing cell of the first terminal device,
wherein, the offset value is equal to mod (Cell ID, N).

16. The terminal device according to claim 13, wherein, the processor is specifically configured to:
receive first configuration information sent by the network device through the transceiver, wherein, the first configuration information is used to indicate the offset value.

17. The terminal device according to claim 11, wherein, the transceiver is further configured to:
receive second configuration information sent by the network device via Radio Resource Control (RRC) dedicated signaling, broadcast signaling or Media Access Control Control Element (MAC CE), wherein, the second configuration information is used to indicate number N of DRX cycles comprised in the DRX indication signal cycle.

18. The terminal device according to claim 11, wherein, the DRX indication signal is used to indicate that multiple terminal devices comprising the first terminal device, wake up or sleep during the active period of M DRX cycles after the moment when the DRX indication signal is detected,
wherein, the multiple terminal devices corresponding to N DRX cycles in the DRX indication signal cycle, and each of the N DRX cycles is used for a corresponding terminal device to detect the DRX indication signal.

19. The terminal device according to claim 18, wherein, the multiple terminal devices belong to one of multiple device groups, and the device group to which the first terminal device belongs is determined according to a UE-ID of the first terminal device, an access level of the first terminal device or a configuration parameter used to represent the device group.

20. The terminal device according to claim 11, wherein, a system frame number (SFN) of a start system frame of the DRX indication signal cycle satisfies: mod (SFN, N×T)=K, wherein, K is a pre-configured natural number, and T is a number of system frames comprised in the DRX cycle.

* * * * *